United States Patent
Kim et al.

(10) Patent No.: US 12,494,263 B2
(45) Date of Patent: Dec. 9, 2025

(54) FLASH MEMORY FOR PERFORMING MARGIN READ TEST OPERATION AND MARGIN READ TEST SYSTEM INCLUDING THE SAME

(71) Applicant: SAMSUNG ELECTRONICS CO., LTD., Suwon-si (KR)

(72) Inventors: Gyuseong Kim, Suwon-si (KR); Hyun-Jin Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 18/236,177

(22) Filed: Aug. 21, 2023

(65) Prior Publication Data
US 2024/0145021 A1    May 2, 2024

(30) Foreign Application Priority Data

Nov. 1, 2022   (KR) .......................... 10-2022-0143650

(51) Int. Cl.
*G11C 7/08*   (2006.01)
*G11C 29/12*   (2006.01)
*G11C 29/46*   (2006.01)

(52) U.S. Cl.
CPC ............ *G11C 29/1201* (2013.01); *G11C 7/08* (2013.01); *G11C 29/46* (2013.01)

(58) Field of Classification Search
CPC ....... G11C 29/1201; G11C 7/08; G11C 29/46; G11C 29/56; G11C 29/50016; G11C 29/028; G11C 29/50; G11C 16/24; G11C 16/26; G11C 2029/5006; G11C 29/026; G11C 29/12005
See application file for complete search history.

(56) References Cited

U.S. PATENT DOCUMENTS

| | | | |
|---|---|---|---|
| 6,028,813 A * | 2/2000 | Choi | G11C 17/12 365/230.03 |
| 8,040,725 B2 | 10/2011 | Kang | |
| 9,224,456 B2 | 12/2015 | Cometti et al. | |
| 11,120,862 B2 | 9/2021 | Takeda | |
| 2007/0201274 A1 | 8/2007 | Yu et al. | |
| 2008/0186786 A1 | 8/2008 | Lin | |
| 2011/0235440 A1 * | 9/2011 | Watanabe | G11C 29/50 365/189.07 |
| 2013/0308377 A1 | 11/2013 | Choi et al. | |
| 2020/0327921 A1 * | 10/2020 | Takeda | G11C 11/4091 |

FOREIGN PATENT DOCUMENTS

KR    10-0891005 B1    3/2009

* cited by examiner

*Primary Examiner* — Mohammed A Bashar
(74) *Attorney, Agent, or Firm* — Sughrue Mion, PLLC

(57) ABSTRACT

A flash memory includes a first memory cell connected with a selected word line and a first bit line, a second memory cell connected with the selected word line and a second bit line, a sense amplifier that provides a sensing line with a sensing current for sensing data stored in the first memory cell or the second memory cell, a bit line selection circuit that selects a bit line by connecting the sensing line with the first bit line or the second bit line, and a margin read test circuit that performs a margin read test operation in which the margin read test circuit provides the sensing line with a margin current for testing a read margin of the data stored in the first memory cell or the second memory cell that is connected to the selected bit line.

20 Claims, 13 Drawing Sheets

FIG.3
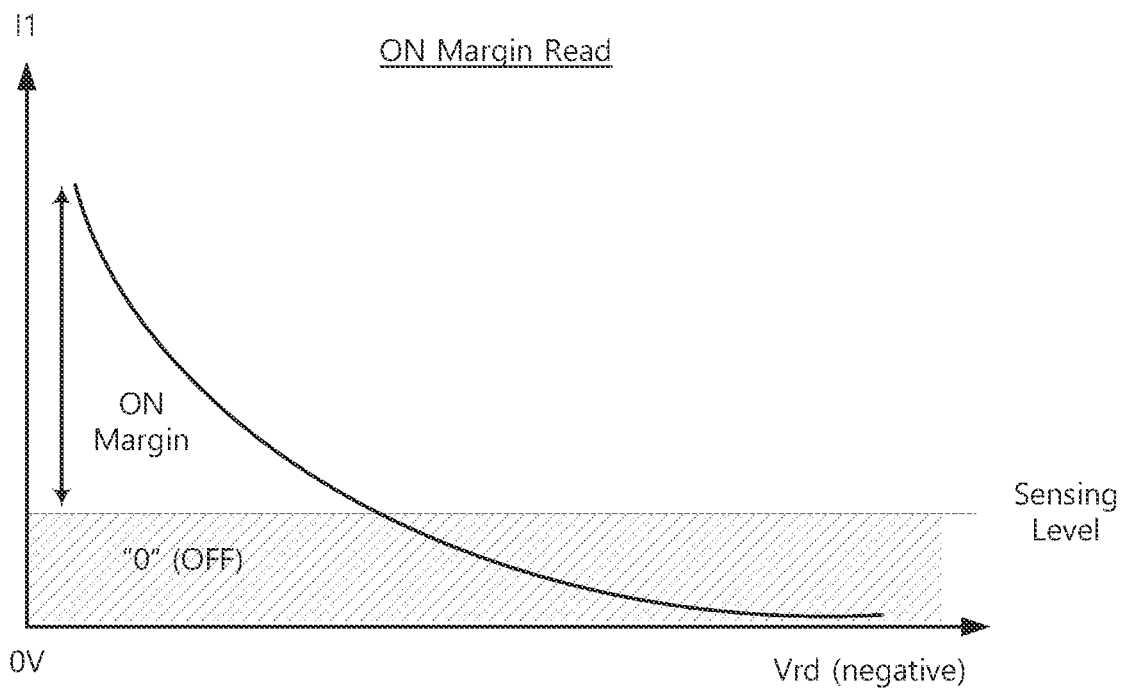
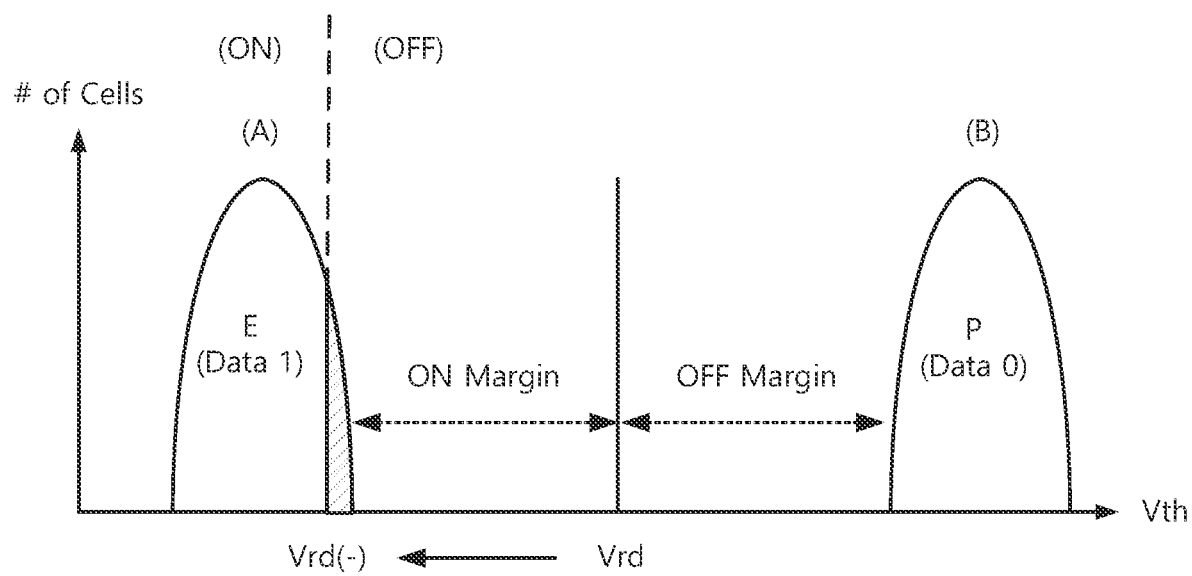

FIG.4
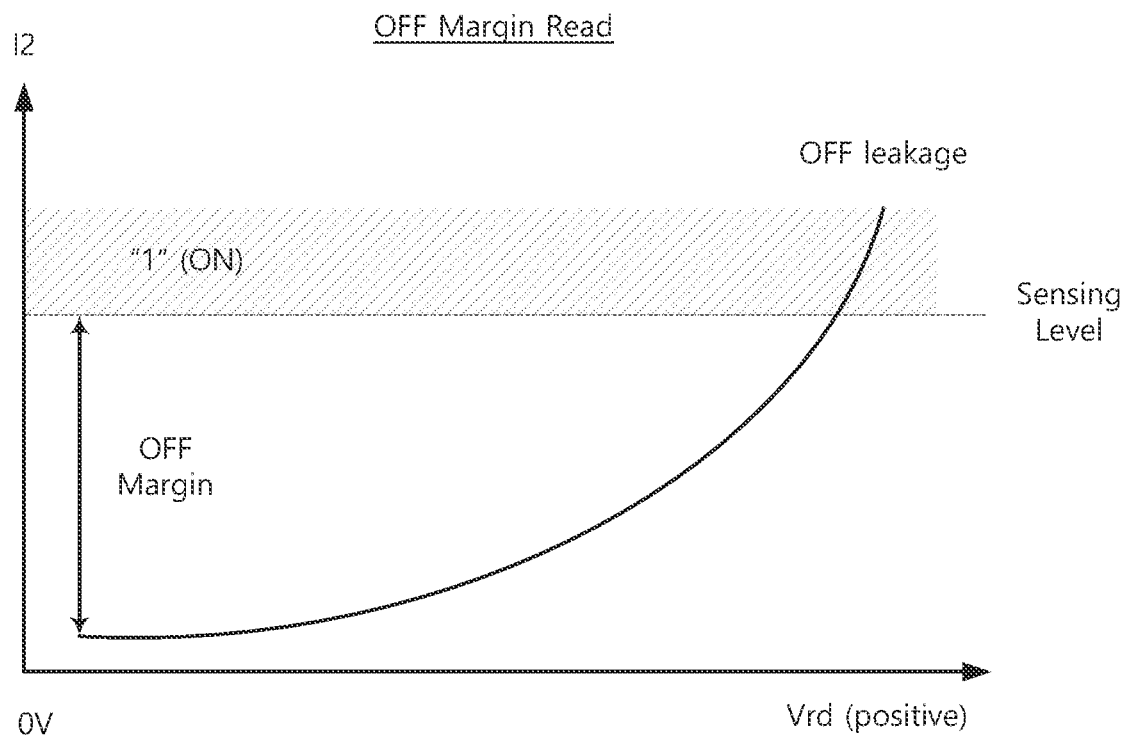
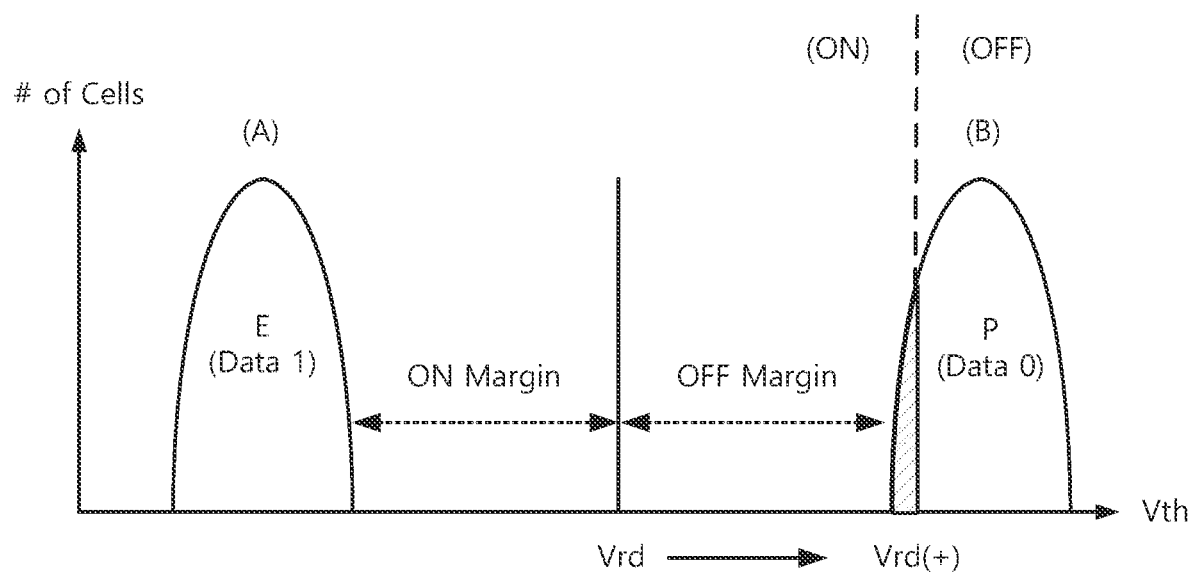

FLASH MEMORY FOR PERFORMING MARGIN READ TEST OPERATION AND MARGIN READ TEST SYSTEM INCLUDING THE SAME

CROSS-REFERENCE TO RELATED APPLICATIONS

This application claims priority under 35 U.S.C. § 119 to Korean Patent Application No. 10-2022-0143650 filed on Nov. 1, 2022, in the Korean Intellectual Property Office, the disclosure of which being incorporated by reference herein in its entirety.

BACKGROUND

Embodiments consistent with the present disclosure relate to a semiconductor memory device, and more particularly, relate to a flash memory for performing a margin read test operation and a margin read test system including the same.

A semiconductor memory may be mainly classified as a volatile memory or a non-volatile memory. Read and write speeds of the volatile memory (e.g., a DRAM or an SRAM) are fast, but the data stored in the volatile memory disappear when a power is turned off In contrast, the non-volatile memory may retain data even when the power is turned off.

A representative example of the non-volatile memory is a flash memory. The flash memory may store multi-bit data of two or more bits in one memory cell. The flash memory that stores the multi-bit data may have one erase state and a plurality of program states depending on threshold voltage distributions.

Nowadays, an embedded flash memory is embedded and used in a portable electronic device such as a smartphone. As the demand on the portable electronic device increases and the amount of data to be stored increases, the embedded flash memory is being gradually highly integrated. In the flash memory, it is important to secure a read margin between program states.

The read margin is investigated by using an external voltage in a margin read test operation of the flash memory. Because the external voltage is used in the margin read test operation, a lot of time is taken to stabilize the external voltage within the flash memory.

SUMMARY

It is an aspect to provide a flash memory capable of reducing a time taken to investigate a read margin by internally performing a margin read test operation.

It is another aspect to provide a margin read test system for performing a margin read test operation in high speed by performing the margin read test operation by using an internal circuit of a flash memory.

According to an aspect of one or more embodiments, a flash memory may include a first memory cell connected with a selected word line and a first bit line; a second memory cell connected with the selected word line and a second bit line; a sense amplifier configured to provide a sensing line with a sensing current for sensing data stored in the first memory cell or the second memory cell; a bit line selection circuit configured to select a bit line by connecting the sensing line with the first bit line or the second bit line; and a margin read test circuit configured to perform a margin read test operation in which the margin read test circuit provides the sensing line with a margin current for testing a read margin of the data stored in the first memory cell or the second memory cell that is connected to the selected bit line.

According to another aspect of one or more embodiments, a margin read test system may include a flash memory including a plurality of memory cells; and a margin read tester configured to provide the flash memory with a command for performing a margin read test operation to test a read margin of data stored in the plurality of memory cells. The flash memory includes a sense amplifier configured to provide a sensing line with a sensing current for sensing the data stored in the plurality of memory cells; and a margin read test circuit configured to provide the sensing line with a margin current for testing the read margin of the data stored in the plurality of memory cells, based on the command.

According to yet another aspect of one or more embodiments, a margin read test system may include a flash memory including a plurality of memory cells; and a margin read tester configured to provide the flash memory with a test command for testing a read margin of data stored in the plurality of memory cells. The flash memory includes a margin read test circuit configured to provide a sensing line with a margin current for testing the read margin of the data stored in the plurality of memory cells, based on the test command.

BRIEF DESCRIPTION OF THE DRAWINGS

The above and other aspects will become apparent by describing in detail various embodiments thereof with reference to the accompanying drawings, in which:

FIGS. 3 and 4 are graphs illustrating how a cell current changes as a read voltage of an embedded flash memory illustrated in FIG. 1 changes;

DETAILED DESCRIPTION

Below, various embodiments will be described in detail and clearly to such an extent that an ordinary one in the art may easily implement the embodiments.

Figure 1:
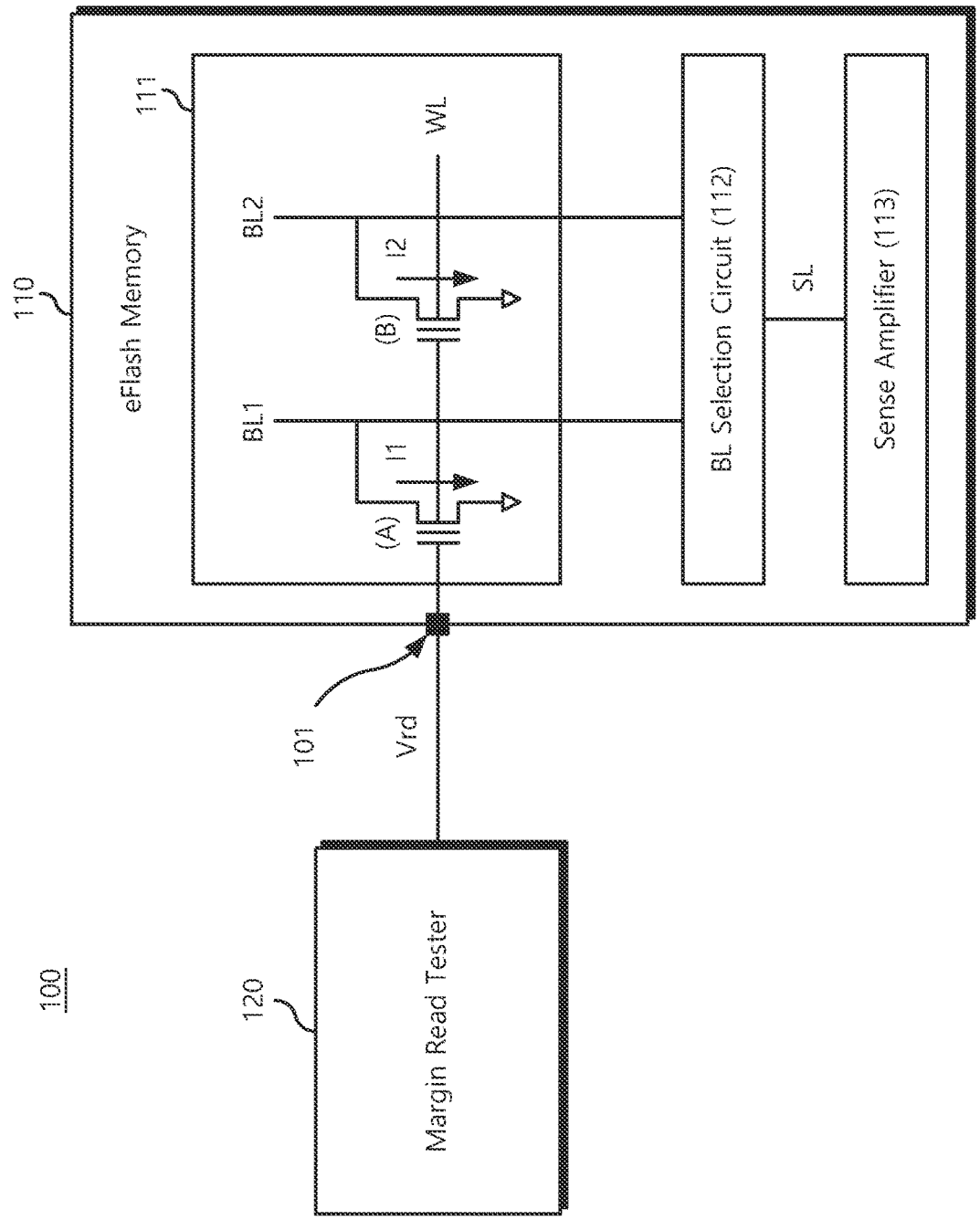
FIG. 1 is a block diagram illustrating a margin read test system for testing an embedded flash memory.

FIG. 1 is a block diagram illustrating a margin read test system for testing an embedded flash memory. Referring to FIG. 1, a margin read test system 100 includes an embedded flash memory (eFlash Memory) 110 and a margin read tester 120.

In a test operation, the embedded flash memory 110 may be supplied with a read voltage Vrd from the margin read tester 120 through an input/output pad 101. The embedded flash memory 110 may perform the read operation by sensing a current flowing to a memory cell. The embedded flash memory 110 may determine whether a selected memory cell is an ON cell or an OFF cell, through the read operation.

The embedded flash memory 110 includes a memory cell array 111, a bit line (BL) selection circuit 112, and a sense amplifier 113. The memory cell array 111 may include a plurality of memory blocks connected with a plurality of word lines and a plurality of bit lines. Each of the memory blocks may include a plurality of memory cells. Each memory cell may store single-bit data or multi-bit data. For convenience of description, a first memory cell "A" and a second memory cell "B" that are connected with one word line WL and are respectively connected with a first bit line BL1 and a second bit line BL2 are illustrated in FIG. 1 by way of example.

The bit line (BL) selection circuit 112 is connected with the memory cell array 111 through the first and second bit lines BL1 and BL2. The bit line selection circuit 112 may select a bit line by using a plurality of NMOS transistors (not illustrated). In the read operation, the NMOS transistor may connect the first or second bit line BL1 or BL2 with a sensing line SL in response to a selection signal.

In the read operation, the sense amplifier 113 may read data stored in the first memory cell "A" or the second memory cell "B" by sensing a difference between a voltage of the sensing line SL and a reference voltage. The sense amplifier 113 may provide a first current I1 and a second current I2 to the first and second bit lines BL1 and BL2 through the sensing line SL, respectively, and may determine an ON cell and an OFF cell by sensing currents flowing to the first and second memory cells "A" and "B".

The margin read tester 120 may perform a margin read test operation. The margin read tester 120 may investigate a read margin of memory cells under a worst case condition. To check the read margin of the memory cells, the margin read tester 120 may provide the read voltage Vrd through the input/output pad 101 in the test operation.

The margin read test system 100 illustrated in FIG. 1 may directly provide the read voltage Vrd through the input/output pad 101 from the outside of the embedded flash memory 110. The margin read tester 120 may investigate whether threshold voltages of the first and second memory cells "A" and "B" belong to any state, by adjusting the read voltage Vrd to be applied to the first and second memory cells "A" and "B".

Figure 2:
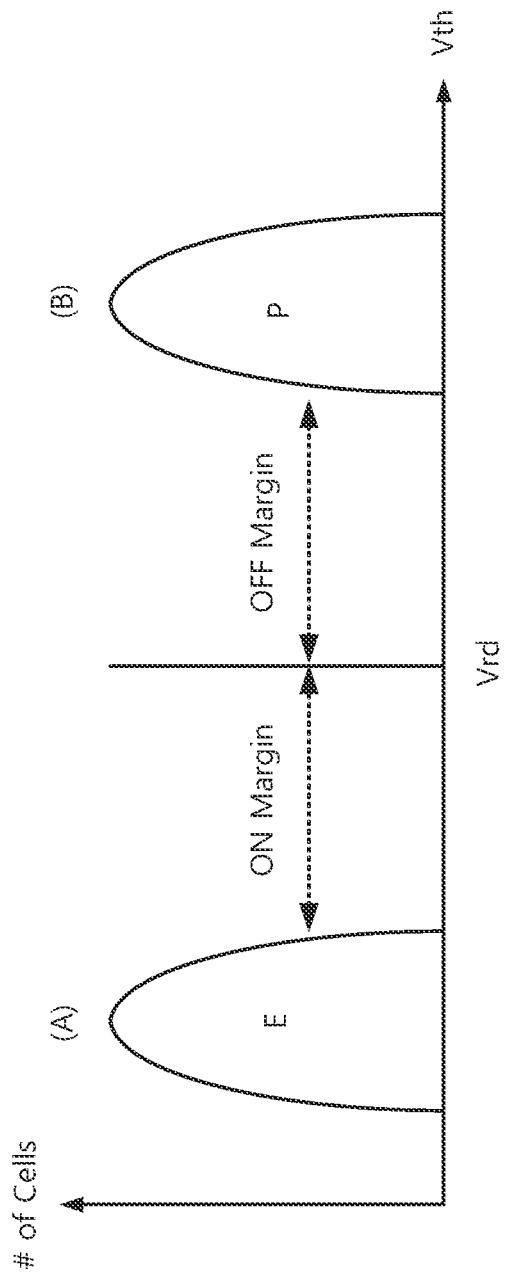
FIG. 2 is a graph illustrating threshold voltage distributions of memory cells of an embedded flash memory illustrated in FIG. 1.

FIG. 2 is a graph illustrating threshold voltage distributions of memory cells of an embedded flash memory illustrated in FIG. 1. In FIG. 2, a horizontal axis represents a threshold voltage, and a vertical axis represents the number of memory cells. Each of the first and second memory cells "A" and "B" may have one of an erase state "E" and a program state "P" depending on a threshold voltage Vth.

The embedded flash memory 110 performs the read operation with an ON margin between the erase state "E" and the read voltage Vrd and an OFF margin between the read voltage Vrd and the program state "P". Assuming that the read voltage Vrd is 0 V, the threshold voltage of the first memory cell "A" may be a negative voltage, and a threshold voltage of the second memory cell "B" may be a positive voltage.

The threshold voltage of the first memory cell "A" is lower than the read voltage Vrd. Accordingly, when the read voltage Vrd is applied to the gate of the first memory cell "A", the first memory cell "A" may be turned on. That is, the first memory cell "A" may be in an ON cell state. When the first memory cell "A" is turned on, a first cell current I1 may flow from the first bit line BL1 to a ground terminal.

In contrast, the threshold voltage of the second memory cell "B" is higher than the read voltage Vrd. Accordingly, when the read voltage Vrd is applied to the gate of the second memory cell "B", the second memory cell "B" may be turned off. The second memory cell "B" may be in an OFF cell state. When the second memory cell "B" is turned off, the flow of a second cell current I2 from the second bit line BL2 to the ground terminal may be blocked.

FIGS. 3 and 4 are graphs illustrating how a cell current changes as a read voltage of an embedded flash memory illustrated in FIG. 1 changes. FIG. 3 shows an ON margin read operation when the read voltage Vrd changes in a negative direction. FIG. 4 shows an OFF margin read operation when the read voltage Vrd changes in a negative direction.

The margin read tester 120 may change the read voltage Vrd provided to the embedded flash memory 110 through the input/output pad 101 during the test operation. As the read voltage Vrd is changed, gate-source voltages of the first and second memory cells "A" and "B" may also be changed. As the gate-source voltages of the first and second memory cells "A" and "B" are changed, the first and second cell currents I1 and I2 may change along a curve as shown in FIGS. 3 and 4.

Referring to FIG. 3, because the threshold voltage of the ON cell has a high negative voltage, the ON margin read operation refers to the process of performing the read operation while gradually decreasing the read voltage Vrd. As the gate-source voltage of the ON cell decreases, the first cell current I1 may also decrease.

When the first cell current I1 decreases and becomes lower than a sensing level, the ON cell may be determined to be an OFF cell. In this case, fail data may be output. That is, data "1" may be output as data "0" being the fail data. A range before the fail data of "0" are output is referred to as an "ON margin".

Referring to FIG. 4, because the threshold voltage of the OFF cell has a high positive voltage, the OFF margin read operation refers to the process of performing the read operation while gradually increasing the read voltage Vrd. As the gate-source voltage of the OFF cell increases, the second cell current I2 may increase. In this case, the second cell current I2 may be a leakage current.

When the second cell current I2 increases and becomes higher than a sensing level, the OFF cell may be determined to be an ON cell. In this case, fail data may be output. That is, data "0" may be output as data "1" being the fail data. A range before the fail data of "1" are output is referred to as an "OFF margin".

The margin read test system 100 illustrated in FIG. 1 applies the read voltage Vrd through the input/output pad 101 from the outside of the embedded flash memory 110. Thus, there is a disadvantage in that the margin read test operation of the embedded flash memory 110 requires test equipment such as the margin read tester 120.

Also, there is another disadvantage in that the margin read test system 100 requires a given wait time until the read voltage Vrd is stabilized within the embedded flash memory 110. Due to the wait time, as illustrated in FIGS. 3 and 4, the cell current may change along the curve as the read voltage Vrd changes.

Figure 5:
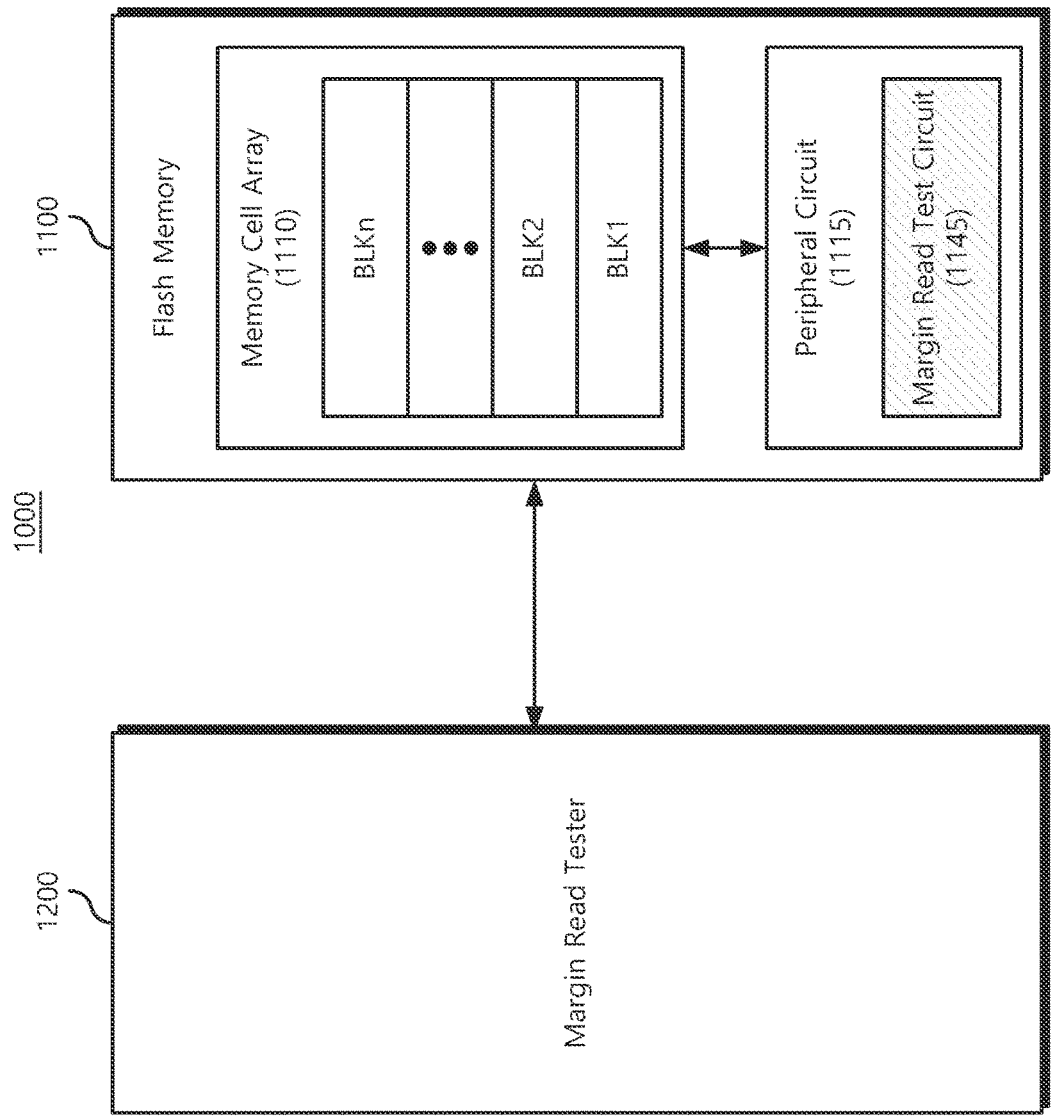
FIG. 5 is a block diagram illustrating a margin read test system according to some embodiments.

FIG. 5 is a block diagram illustrating a margin read test system according to some embodiments. Referring to FIG. 5, a margin read test system 1000 includes a flash memory 1100 and a margin read tester 1200. The margin read test system 1000 may perform the margin read test operation of the flash memory 1100 under control of the margin read tester 1200.

The flash memory 1100 includes a memory cell array 1110 and a peripheral circuit 1115. The memory cell array 1110 may include a plurality of memory blocks BLK1 to BLKn. Each of the memory blocks BLK1 to BLKn may have a two-dimensional structure or a vertical or three-dimensional structure. Each of the memory blocks BLK1 to BLKn may include a plurality of memory cells. Each memory cell may store single-bit data or multi-bit data.

In some embodiments, the memory cell array 1110 may be placed next to the peripheral circuit 1115 in a design/layout structure. In some embodiments, the memory cell array 1110 may be placed on the peripheral circuit 1115 in a design/layout structure. A structure in which the memory cell array 1110 is placed on the peripheral circuit 1115 is called a cell on peripheral (COP) structure. In some embodiments, the memory cell array 1110 may be implemented with a chip that is independent of the peripheral circuit 1115. An upper chip including the memory cell array 1110 and a lower chip including the peripheral circuit 1115 may be coupled to each other by the bonding scheme. This structure is called a chip to chip (C2C) structure.

The peripheral circuit 1115 may include analog circuits, digital circuits, or analog and digital circuits, which are used to store data in the memory cell array 1110 or to read data stored in the memory cell array 1110. The peripheral circuit 1115 may receive an external power from the margin read tester 1200 and may generate various levels of internal powers (e.g., VDD).

The peripheral circuit 1115 may receive a command, an address, and data from the margin read tester 1200. The peripheral circuit 1115 may store data in the memory cell array 1110 in response to a control signal CTRL. The peripheral circuit 1115 may read data stored in the memory cell array 1110 and may provide the read data to the margin read tester 1200.

The peripheral circuit 1115 may include a margin read test circuit 1145. The margin read test circuit 1145 may perform the read operation by adjusting a current flowing to a memory cell in the test operation. The margin read test circuit 1145 may determine whether a selected memory cell is an ON cell or an OFF cell, through the read operation.

Figure 6:
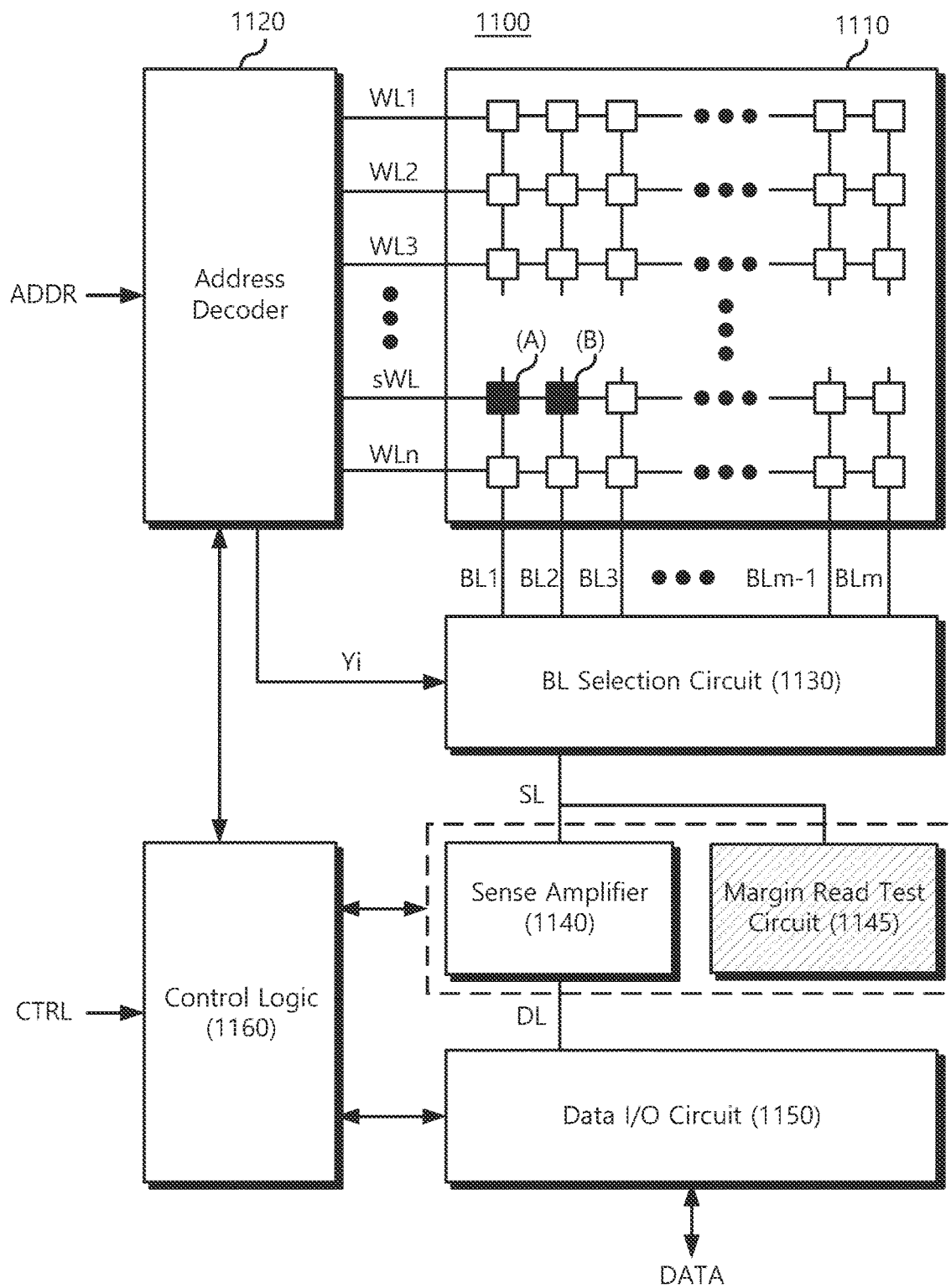
FIG. 6 is a block diagram illustrating a flash memory illustrated in FIG. 5, according to some embodiments.

FIG. 6 is a block diagram illustrating a flash memory illustrated in FIG. 5, according to some embodiments. Referring to FIG. 6, the flash memory 1100 may include the memory cell array 1110, an address decoder 1120, a bit line (BL) selection circuit 1130, a sense amplifier 1140, the margin read test circuit 1145, a data input/output (I/O) circuit 1150, and control logic 1160.

The memory cell array 1110 may include a plurality of memory cells connected between a plurality of word lines WL1 to WLn and a plurality of bit lines BL1 to BLm. Each memory cell may store data by using a threshold voltage distribution characteristic. Single-bit data or multi-bit data may be stored in a memory cell. A memory cell storing the single-bit data is called a single-level cell SLC, and a memory cell storing the multi-bit data is called a multi-level cell MLC.

The single-level cell SLC may store one data bit of "0" or "1". The multi-level cell MLC may store two or more data bits. A memory cell has one of multiple states through an MLC program operation. For example, assuming that 2-bit data are stored in one memory cell, the memory cell may have one of four states (1,1), (1,0), (0,1), and (0,0). A memory cell of the (1,1) state may have the highest threshold voltage, and a memory cell of the (0,0) state may have the lowest threshold voltage. A memory cell of the (1,0) state, being an intermediate state, may have a first intermediate threshold voltage, and a memory cell of the (0,1) state, being an intermediate state, may have a second intermediate threshold voltage. A threshold voltage of the memory cell of the (1,0) state may be greater than the threshold voltage of the memory cell of the (0,1) state. That is, the first intermediate threshold voltage may be greater than the second intermediate threshold voltage.

The address decoder 1120 is connected with the memory cell array 1110 through the plurality of word line WL1 to WLn. The address decoder 1120 may decode an address ADDR received from the outside the flash memory 1100 and may provide a word line voltage to a selected word line sWL based on a decoding result. The address decoder 1120 may generate a selection signal Yi for selecting the bit lines BL1 to BLm. The selection signal Yi is provided to the bit line selection circuit 1130.

The bit line (BL) selection circuit 1130 is connected with the memory cell array 1110 through the bit lines BL1 to BLm. The bit line selection circuit 1130 may select a bit line in response to the selection signal Yi provided from the address decoder 1120. The bit line selection circuit 1130 may select a bit line by using a plurality of NMOS transistors (not illustrated). In the read operation, an NMOS transistor may connect the bit line BL with the sensing line SL in response to the selection signal Yi.

In the example of FIG. 6, one word line sWL is selected by the address decoder 1120, and the first or second bit line BL1 or BL2 is selected by the bit line selection circuit 1130. The flash memory 1100 may select a first memory cell "A" or a second memory cell "B", which is connected in common with the selected word line sWL and is connected with the first or second bit line BL1 or BL2, through the address ADDR.

Figure 10:
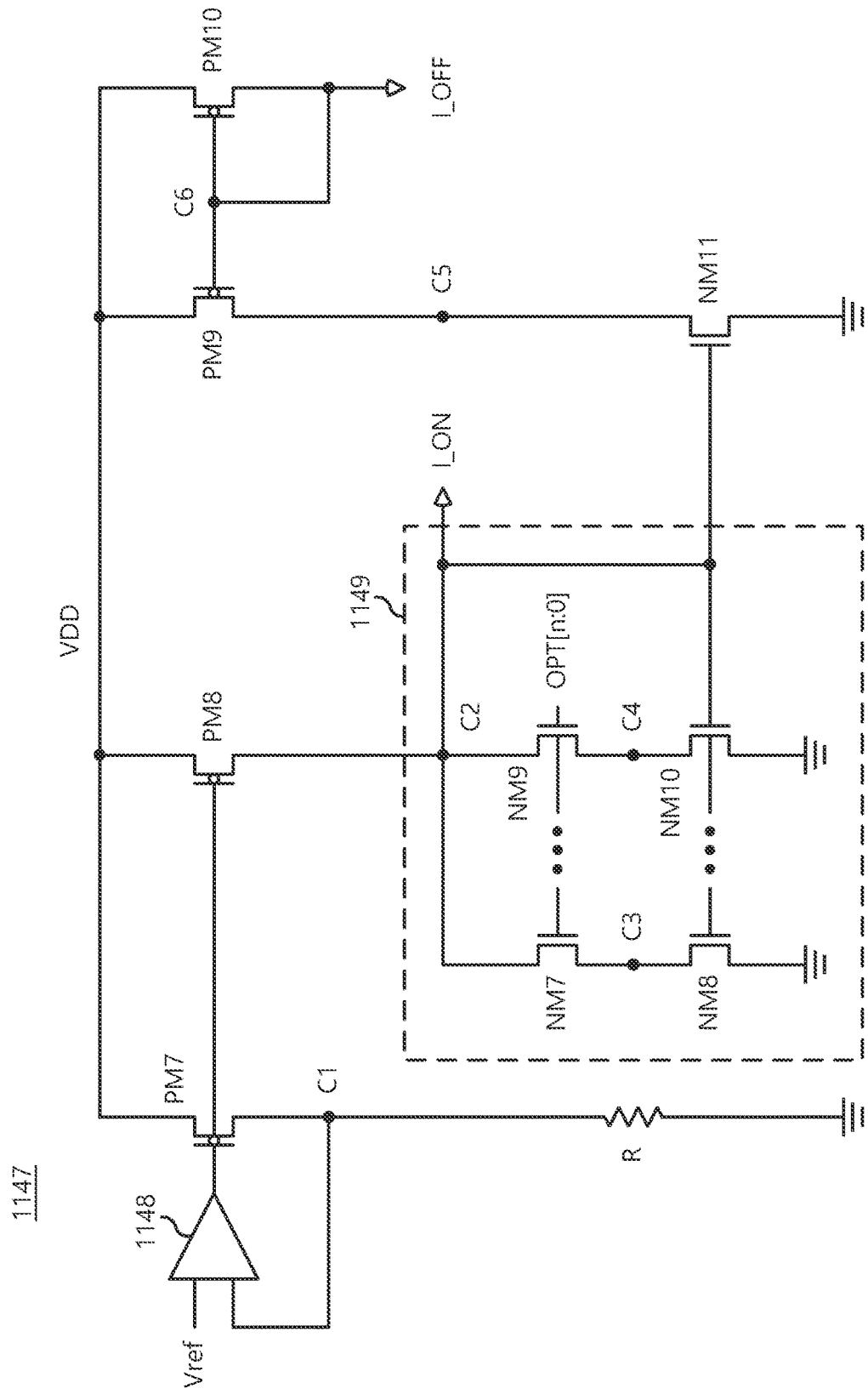
FIG. 10 is a circuit diagram illustrating an internal current generator illustrated in FIG. 9, according to some embodiments.

In the read operation, the sense amplifier 1140 may read data stored in the selected memory cell "A" or "B" by sensing a difference between a voltage of the sensing line SL and a reference voltage Vref (see FIG. 10). The reference voltage Vref may be provided from a reference voltage generation circuit (not illustrated). The sense amplifier 1140 may operate in response to a control signal provided from the control logic 1160.

The sense amplifier 1140 may provide a sensing current for the purpose of reading data stored in the selected memory cell "A" or "B". A cell current that is provided to the selected memory cell "A" or "B" in the margin read test operation may include a sensing current and a margin current. The margin current may be provided from the margin read test circuit 1145. The sense amplifier 1140 may output an output voltage on a data line DL to the data input/output circuit 1150.

The data input/output (I/O) circuit 1150 may receive data "DATA" from input/output terminals or may output the data "DATA" to the input/output terminals. The number of input/output terminals may vary depending on a kind of the flash memory 1100. The data input/output circuit 1150 may output data provided from the sense amplifier 1140 to the outside in response to a data input/output control signal. The data input/output control signal may be provided from the control logic 1160.

The control logic 1160 may control the address decoder 1120, the sense amplifier 1140, and the data input/output circuit 1150 in response to the control signal CTRL.

Figure 7:
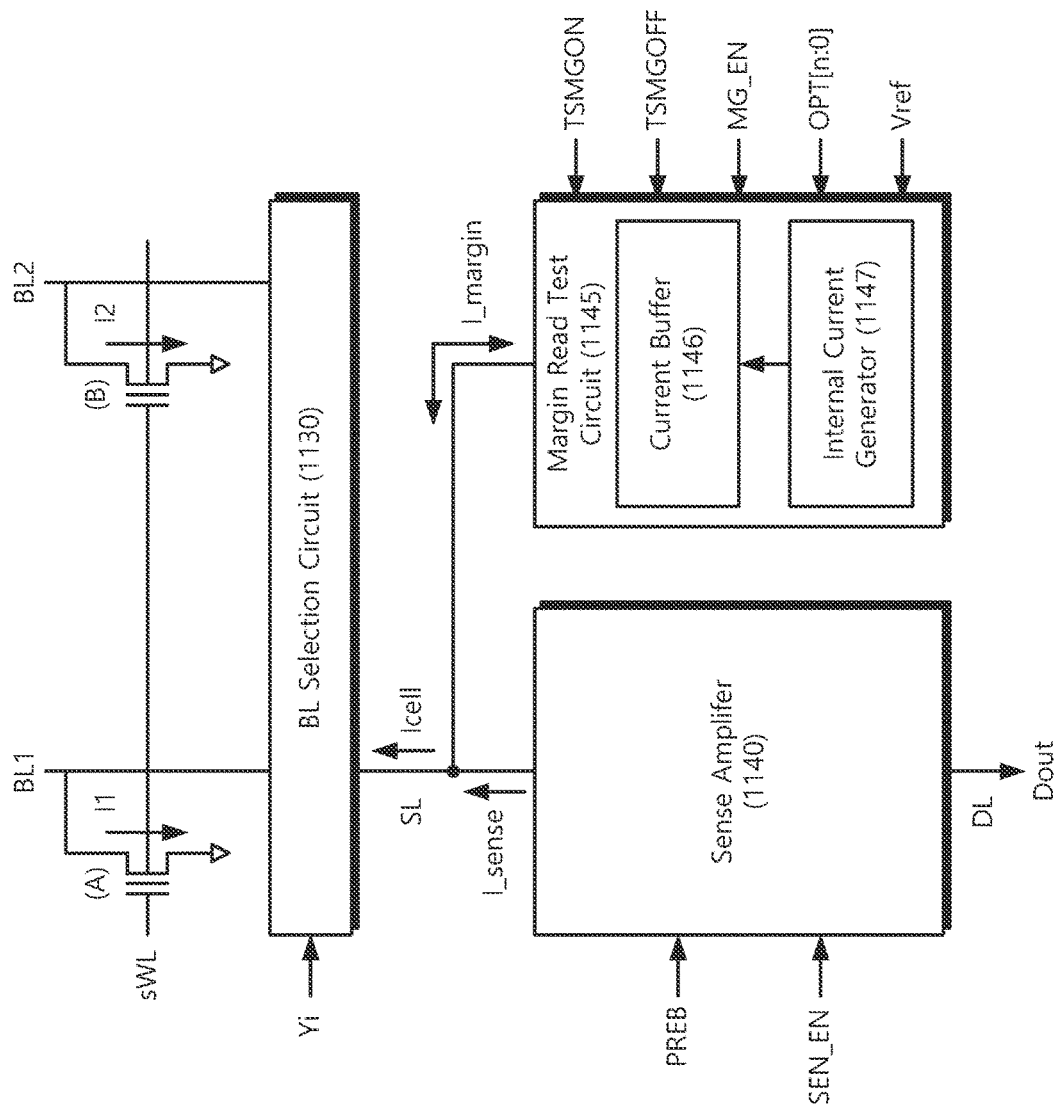
FIG. 7 is a block diagram for describing a margin read test operation of a flash memory illustrated in FIG. 6, according to some embodiments.

FIG. 7 is a block diagram for describing a margin read test operation of a flash memory illustrated in FIG. 6, according to some embodiments. Referring to FIG. 7, the sense amplifier 1140 may provide a cell current Icell to the selected memory cell "A" or "B" through the bit line selection circuit 1130. The first or second cell current I1 or I2 may flow to the first or second memory cell "A" or "B".

The cell current Icell may include a sensing current I_sense and a margin current I_margin. The sensing current I_sense may be provided from the sense amplifier 1140, and the margin current I_margin may be provided from the margin read test circuit 1145. The sense amplifier 1140 may provide the sensing line SL with a sum or a difference of the sensing current I_sense and the margin current I_margin.

The sense amplifier 1140 may generate the sensing current I_sense in response to a bit line precharge signal PREB and a sense amplifier enable signal SEN_EN, and may output the output voltage Dout to the data line DL. The sensing current I_sense may be provided to the sensing line SL. When the sensing current I_sense is higher than or equal to a sensing level, the sense amplifier 1140 may output data "1"; when the sensing current I_sense is lower than the sensing level, the sense amplifier 1140 may output data "0".

The margin read test circuit 1145 may include a current buffer 1146 and an internal current generator 1147. The current buffer 1146 may receive a test margin ON signal TSMGON, a test margin OFF signal TSMGOFF, and a margin read enable signal MG_EN and may output the margin current I_margin based on one or more of the test margin ON signal TSMGON, the test margin OFF signal TSMGOFF, and/or the margin read enable signal MG_EN. The margin current I_margin may be provided to the sensing line SL.

The internal current generator 1147 may generate and adjust the margin current I_margin or may vary the margin current I_margin. When the test operation is performed while the internal current generator 1147 adjusts the margin current I_margin, the flash memory 1100 may check the read margins of memory cells connected with the selected word line sWL.

Figure 8:
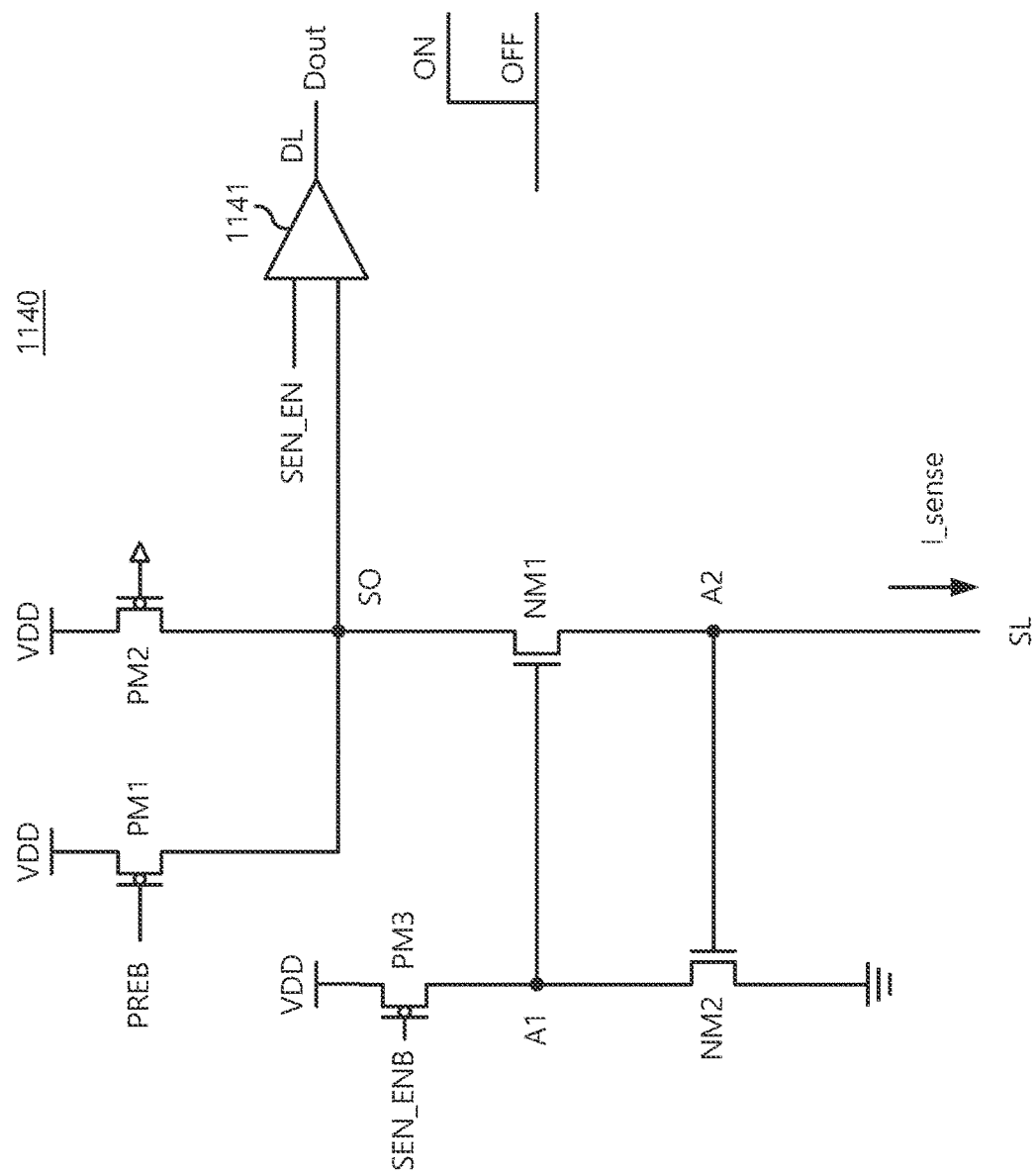
FIG. 8 is a circuit diagram illustrating a sense amplifier illustrated in FIG. 7, according to some embodiments.

FIG. 8 is a circuit diagram illustrating a sense amplifier illustrating in FIG. 7, according to some embodiments. Referring to FIG. 8, the sense amplifier 1140 includes a plurality of PMOS transistors, a plurality of NMOS transistors, and a comparator 1141.

A first PMOS transistor PM1 is connected between a power terminal VDD and a sensing node SO. The first PMOS transistor PM1 may form a current path between the power terminal VDD and the sensing node SO in response to the bit line precharge signal PREB. A second PMOS transistor PM2 is connected between the power terminal VDD and the sensing node SO. A ground terminal may be connected with a gate of the second PMOS transistor PM2, and the second PMOS transistor PM2 may form a current path between the power terminal VDD and the sensing node SO. A third PMOS transistor PM3 is connected between the power terminal VDD and a first node A1. The third PMOS transistor PM3 may form a current path between the power terminal VDD and the first node A1 in response to the sense amplifier enable signal SEN_EN.

A first NMOS transistor NM1 is connected between the sensing node SO and a second node A2. The first NMOS transistor NM1 may form a current path between the sensing node SO and the second node A2 in response to a voltage level of the first node A1. A second NMOS transistor NM2 is connected between the first node A1 and the ground terminal. The second NMOS transistor NM2 may form a current path between the first node A1 and the ground terminal in response to a voltage level of the second node A2.

The comparator 1141 is connected between the sensing node SO and a data line DL. That is, the sensing node SO is connected to one input of the comparator 1141 and the data line DL is connected to an output of the comparator 1141. The sense amplifier enable signal SEN_EN is connected to the other input of the comparator 1141. The comparator 1141 compares a voltage level of the sense amplifier enable signal SEN_EN and a voltage level of the sensing node SO and provides an output voltage Dout to the data line DL depending on a comparison result. When a memory cell is an ON cell, the comparator 1141 may provide the output voltage Dout of the high level. When the memory cell is an OFF cell, the comparator 1141 may provide the output voltage Dout of the low level.

The sense amplifier 1140 may determine whether data stored in the first or second memory cell "A" or "B" is "0" or "1". The sense amplifier 1140 may determine data stored in a memory cell by providing a bit line precharge voltage to a bit line and sensing a voltage level of the sensing node SO.

Figure 9:
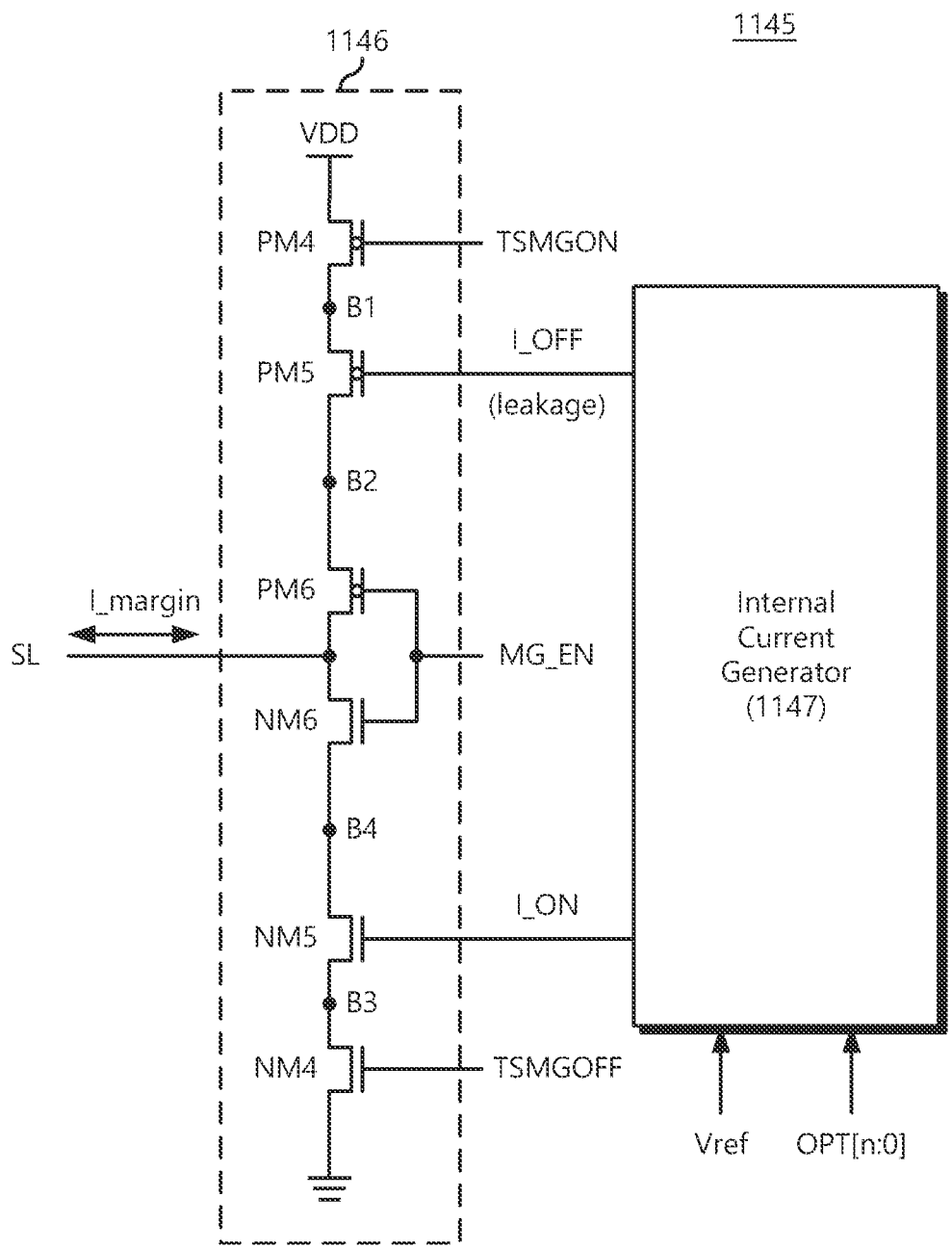
FIG. 9 is a circuit diagram illustrating a margin read test circuit illustrated in FIG. 7, according to some embodiments.

FIG. 9 is a circuit diagram illustrating a margin read test circuit illustrated in FIG. 7, according to some embodiments. Referring to FIG. 9, the margin read test circuit 1145 includes the current buffer 1146 and the internal current generator 1147.

The current buffer 1146 acts as a buffer that connects a current generated from the internal current generator 1147 with the sense amplifier 1140. The current buffer 1146 may generate the margin current I_margin in response to the margin read enable signal MG_EN. Because an OFF margin current supplies a sensing current, the OFF margin current may be generated by a PMOS transistor. Because an ON margin current decreases a sensing current, the ON margin current may be generated by an NMOS transistor.

A fourth PMOS transistor PM4 is connected between the power terminal VDD and a first node B1. The fourth PMOS transistor PM4 may form a current path between the power terminal VDD and the first node B1 in response to the test margin ON signal TSMGON. A fifth PMOS transistor PM5 is connected between the first node B1 and a second node B2. An OFF margin current IOFF may be provided to a gate of the fifth PMOS transistor PM5. The OFF margin current I_OFF may be a leakage current.

A fourth NMOS transistor NM4 is connected between a third node B3 and the ground terminal. The fourth NMOS transistor NM4 may form a current path between the third node B3 and the ground terminal in response to the test margin OFF signal TSMGOFF. A fifth NMOS transistor NM5 is connected between a fourth node B4 and the third node B3. An ON margin current ION may be provided to a gate of the fifth NMOS transistor NM5.

A sixth PMOS transistor PM6 is connected between the second node B2 and the sensing line SL. A sixth NMOS transistor NM6 is connected between the sensing line SL and the fourth node B4. The margin read enable signal MG_EN may be provided to gates of the sixth PMOS transistor PM6 and the sixth NMOS transistor NM6.

The current buffer 1146 may receive the test margin ON signal TSMGON, the test margin OFF signal TSMGOFF, and the margin read enable signal MG_EN and may output the margin current I_margin, based on one or more of the test margin ON signal TSMGON, the test margin OFF signal TSMGOFF, and/or the margin read enable signal MG_EN. The margin current I_margin may be provided to the sensing line SL.

The internal current generator 1147 may generate and adjust the margin current I_margin or may vary the margin current I_margin. When the test operation is performed while the internal current generator 1147 adjusts the margin current I_margin, the flash memory 1100 may check the read margins of memory cells connected with the selected word line sWL.

FIG. 10 is a circuit diagram illustrating an internal current generator illustrated in FIG. 9, according to some embodiments. Referring to FIG. 10, the internal current generator 1147 may include a comparator 1148, a resistor "R", a plurality of PMOS transistors PM7 to PM10, and a plurality of NMOS transistors NM7 to NM11.

The seventh PMOS transistor PM7 is connected between the power terminal VDD and a first node C1. The seventh PMOS transistor PM7 may form a current path between the power terminal VDD and the first node C1 in response to an output voltage of the comparator 1148. The comparator 1148 may receive the reference voltage Vref and a voltage of the first node C1 and may provide the output voltage to a gate of the seventh PMOS transistor PM7. The resistor "R" may be connected between the first node C1 and the ground terminal.

The eighth PMOS transistor PM8 is connected between the power terminal VDD and a second node C2. The eighth PMOS transistor PM8 may form a current path between the power terminal VDD and the second node C2 in response to the output voltage of the comparator 1148. The comparator 1148 may receive the reference voltage Vref and the voltage of the first node C1 and may provide the output voltage to a gate of the eighth PMOS transistor PM8.

A current option circuit 1149 may be provided between the second node C2 and the ground terminal. The current option circuit 1149 may include the plurality of NMOS transistors NM7 to NM10. The current option circuit 1149 may generate the ON margin current I_ON through a current option. The ON margin current I_ON may be provided to the gate of the fifth NMOS transistor NM5 of the current buffer 1146. The current option circuit 1149 may control the ON margin current I_ON through a current option control signal OPT[n:0]. The current option control signal OPT[n:0] may be provided from the control logic 1160.

The seventh NMOS transistor NM7 is connected between the second node C2 and a third node C3. The seventh NMOS transistor NM7 may form a current path between the second node C2 and the third node C3 in response to the current option control signal OPT[n:0]. The eighth NMOS transistor NM8 is connected between the third node C3 and the ground terminal. A voltage of the second node C2 may be provided to a gate of the eighth NMOS transistor NM8. The eighth NMOS transistor NM8 may be turned on or off in response to the voltage of the second node C2.

The ninth NMOS transistor NM9 is connected between the second node C2 and a fourth node C4. The ninth NMOS transistor NM9 may form a current path between the second node C2 and the fourth node C4 in response to the current option control signal OPT[n:0]. The tenth NMOS transistor NM10 is connected between the fourth node C4 and the ground terminal. The tenth NMOS transistor NM10 may be turned on or off in response to the voltage of the second node C2.

A plurality of NMOS transistors may be provided between the seventh NMOS transistor NM7 and the ninth NMOS transistor NM9 so as to be connected between the second node C2 and intermediate nodes (not illustrated). A plurality of NMOS transistors that are turned on or off depending on the voltage of the second node C2 may be provided between the eighth NMOS transistor NM8 and the tenth NMOS transistor NM10 so as to be connected between the intermediate nodes and the ground terminal.

The ninth PMOS transistor PM9 is connected between the power terminal VDD and a fifth node C5. The ninth PMOS transistor PM9 may form a current path between the power terminal VDD and the fifth node C5 in response to a voltage of a sixth node C6. The tenth PMOS transistor PM10 is connected between the power terminal VDD and the sixth node C6. The tenth PMOS transistor PM10 may form a current path between the power terminal VDD and the sixth node C6 in response to the voltage of the sixth node C6.

The internal current generator 1147 may form a PMOS current mirror by using the ninth PMOS transistor PM9 and the tenth PMOS transistor PM10. The PMOS current mirror may provide the OFF margin current I_OFF to the current buffer 1146 through the sixth node C6. The OFF margin current IOFF may be provided the gate of the PMOS transistor PM5 of the current buffer 1146.

The internal current generator 1147 may provide the ON margin current I_ON or the OFF margin current I_OFF to the current buffer 1146. Because the ON margin current I_ON plays a role of decreasing the sensing current in the current buffer 1146, the ON margin current I_ON may be output to an NMOS transistor current mirror. Because the OFF margin current I_OFF plays a role of increasing the sensing current in the current buffer 1146, the OFF margin current IOFF may be output to a PMOS transistor current mirror.

Figure 11:
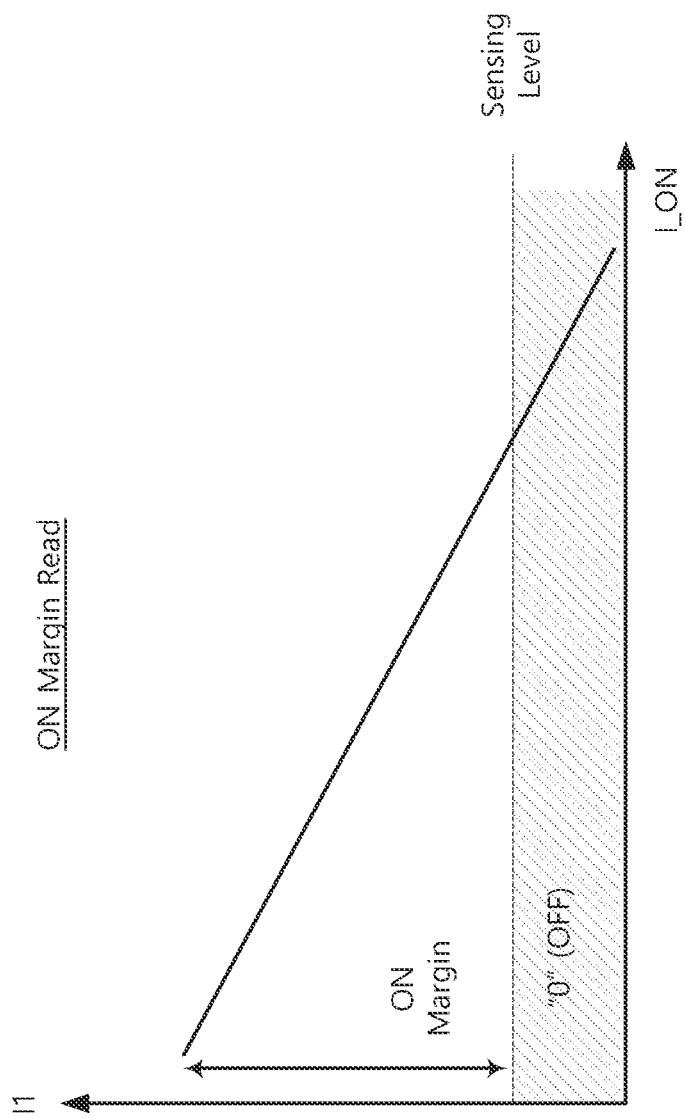
FIGS. 11 and 12 are graphs illustrating how a cell current changes as a margin current of a flash memory illustrated in FIG. 10 changes, according to some embodiments.
Figure 12:
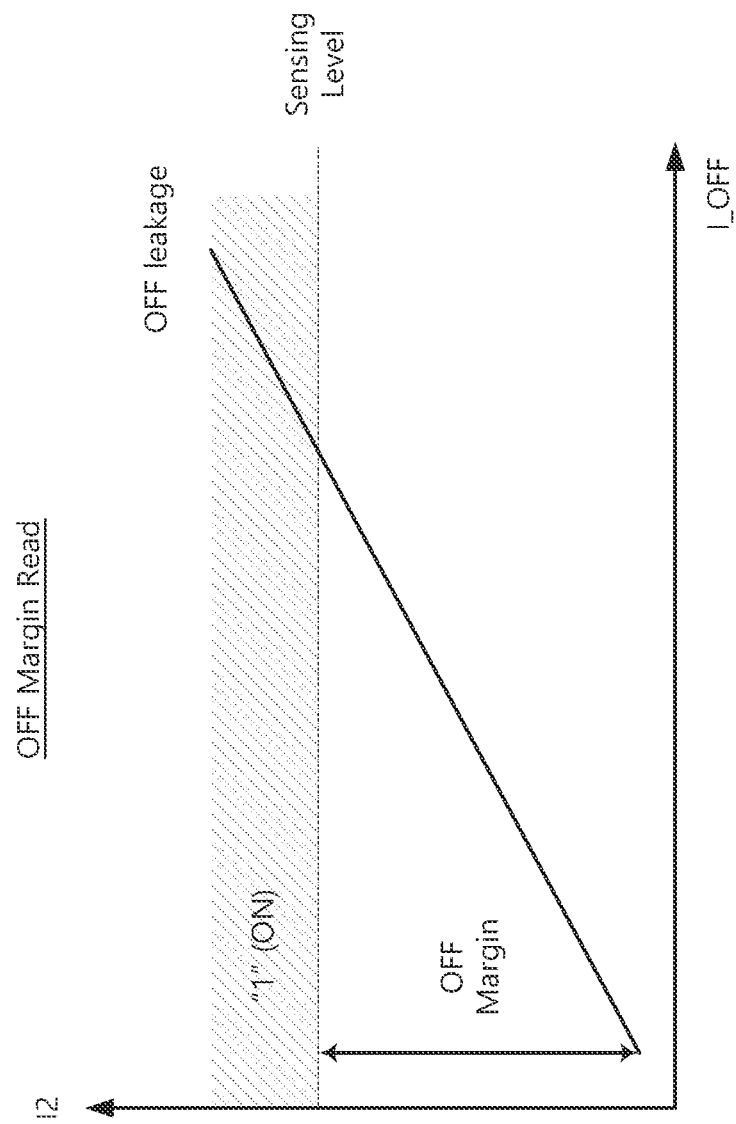

FIGS. 11 and 12 are graphs illustrating how a cell current changes as a margin current of a flash memory illustrated in FIG. 10 changes, according to some embodiments. FIG. 11 shows how a cell current changes as the ON margin current I_ON changes, and FIG. 12 shows how a cell current changes as the OFF margin current I_OFF changes.

Referring to FIG. 11, an ON margin read operation refers to the process of performing the margin read test operation while increasing the ON margin current I_ON of FIG. 10. The ON margin current I_ON may be adjusted through the current option circuit 1149 of the internal current generator 1147. As the ON margin current I_ON increases, the margin current I_margin decreases. As the margin current I_margin decreases, the cell current Icell decreases. This relationship means that the first cell current I1 decreases.

When the first cell current I1 decreases and becomes lower than the sensing level, the ON cell may be determined to be an OFF cell. In this case, fail data may be output. That is, data "1" may be output as data "0" being the fail data. A range before the fail data of "0" are output is referred to as an "ON margin".

Referring to FIG. 12, an OFF margin read operation refers to the process of performing the margin read test operation while increasing the OFF margin current I_OFF of FIG. 10. The OFF margin current I_OFF may be adjusted through the PMOS current mirror of the internal current generator 1147. As the OFF margin current I_OFF increases, the margin current I_margin increase. As the margin current I_margin increases, the cell current Icell increases. This relationship means that the second cell current I2 increases. The second cell current I2 may be a leakage current.

When the second cell current I2 increases and becomes higher than the sensing level, the OFF cell may be determined to be an ON cell. In this case, fail data may be output. That is, data "0" may be output as data "1" being the fail data. A range before the fail data of "1" are output is referred to as an "OFF margin".

The margin read tester 1200 (refer to FIG. 5) may provide the flash memory 1100 with a command for the margin read test operation during the test operation. The flash memory 1100 may internally perform the margin read test operation through the margin read test circuit 1145. Because the operation speed of the current buffer 1146 and the internal current generator 1147 of the margin read test circuit 1145 is fast, the margin read test operation may be quickly performed.

Because the margin read test operation is performed within the flash memory 1100, the margin read test system 1000 according to some embodiments may reduce a stabilization time required when the flash memory 1100 uses the external voltage as in the related art. According to some embodiments, it may be possible to reduce a test time taken to perform the margin read test operation and to perform the margin read test operation in high speed.

Figure 13:
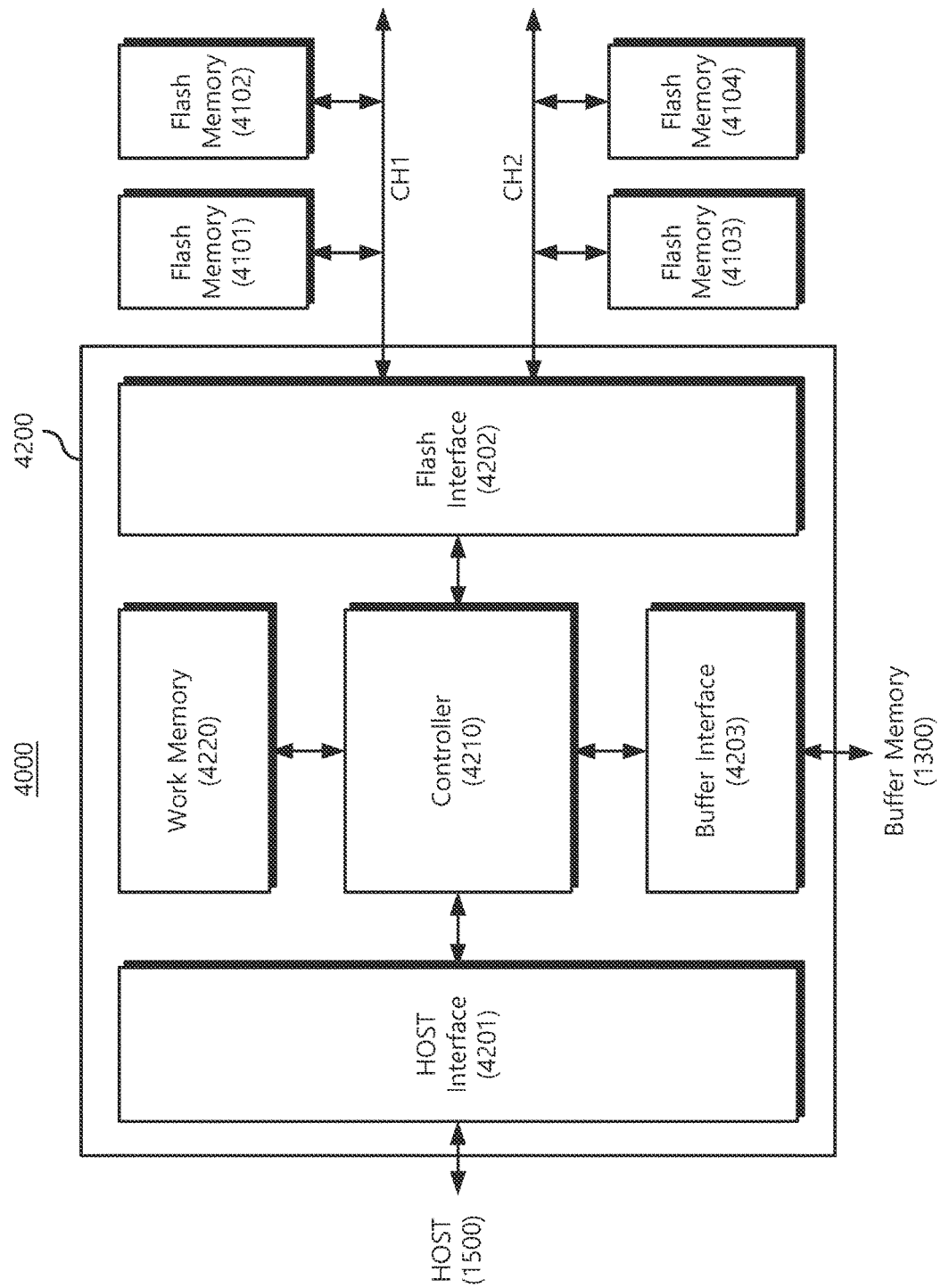
FIG. 13 is a block diagram illustrating an example in which a solid state drive (SSD) is implemented with a flash memory according to some embodiments.

FIG. 13 is a block diagram illustrating an example in which a solid state drive (SSD) is implemented with a flash memory according to some embodiments. Referring to FIG. 13, an SSD 4000 may include a plurality of flash memories 4101 to 4104 and an SSD controller 4200.

The first and second flash memories 4101 and 4102 may be connected with the SSD controller 4200 through a first channel CH1. The third and fourth flash memories 4103 and 4104 may be connected with the SSD controller 4200 through a second channel CH2. The number of channels connected with the SSD controller 4200 may be 2 or more. The number of flash memories connected with one channel may be 2 or more.

The SSD controller 4200 may include a host interface 4201, a flash interface 4202, a buffer interface 4203, a controller 4210, and a work memory 4220. The SSD controller 4200 may be connected with a host 1500 through the host interface 4201. Depending on a request of the host 1500, the SSD controller 4200 may write data in the corresponding flash memory or may read data from the corresponding flash memory.

The SSD controller 4200 may be connected with the plurality of flash memories 4101 to 4104 through the flash interface 4202 and may be connected with a buffer memory 1300 through the buffer interface 4203. The flash interface 4202 may provide data, which are temporarily stored in the buffer memory 1300, to flash memories through the channels CH1 and CH2. The flash interface 4202 may transfer the data read from the flash memories 4101 to 4104 to the buffer memory 1300.

The controller 4210 may analyze and process the signal received from the host 1500. The controller 4210 may control the host 1500 through the host interface 4201 or may control the flash memories 4101 to 4104 through the flash interface 4202. The controller 4210 may control operations of the flash memories 4101 to 4104 by using firmware for driving the SSD 4000.

The SSD controller 4200 may manage data to be stored in the flash memories 4101 to 4104. In the sudden power-off event, the SSD controller 4200 may back the data stored in the work memory 4220 or the buffer memory 1300 up to the flash memories 4101 to 4104.

According to various embodiments, because a margin read test operation is performed within a flash memory, a stabilization time required when the flash memory uses an external voltage may be reduced. According to various embodiments, it may be possible to reduce a test time taken to perform the margin read test operation and to perform the margin read test operation in high speed.

While the present disclosure has been described with reference to various embodiments thereof, it will be apparent to those of ordinary skill in the art that various changes and modifications may be made thereto without departing from the spirit and scope of the present disclosure as set forth in the following claims.

What is claimed is:

1. A flash memory comprising:
   a first memory cell connected with a selected word line and a first bit line;
   a second memory cell connected with the selected word line and a second bit line;
   a sense amplifier configured to provide a sensing line with a sensing current for sensing data stored in the first memory cell or the second memory cell;
   a bit line selection circuit configured to select a bit line by connecting the sensing line with the first bit line or the second bit line; and
   a margin read test circuit configured to perform a margin read test operation in which the margin read test circuit provides the sensing line with a margin current and adjusts the margin current provided to the sensing line to test a read margin of the data stored in the first memory cell or the second memory cell that is connected to the selected bit line.

2. The flash memory of claim 1, wherein, in the margin read test operation, the margin read test circuit provides a sum of the sensing current and the margin current or a difference of the sensing current and the margin current to the selected bit line.

3. The flash memory of claim 2, wherein the margin read test operation comprises an ON margin read operation and, in the ON margin read operation, the margin read test circuit provides the difference of the sensing current and the margin current to the selected bit line.

4. The flash memory of claim 2, wherein the margin read test operation comprises an OFF margin read operation and, in the OFF margin read operation, the margin read test circuit provides the sum of the sensing current and the margin current to the selected bit line.

5. The flash memory of claim 1, wherein the margin read test circuit includes:
   an internal current generator configured to generate an ON margin current or an OFF margin current; and
   a current buffer configured to receive the ON margin current or the OFF margin current and to adjust the margin current, based on the ON margin current or the OFF margin current.

6. The flash memory of claim 5, wherein the internal current generator includes a current option circuit for adjusting the ON margin current.

7. The flash memory of claim 5, wherein the internal current generator includes a PMOS transistor current mirror for adjusting the OFF margin current.

8. The flash memory of claim 5, wherein the current buffer performs an ON margin read test operation or an OFF margin read test operation based on a test margin ON signal or a test margin OFF signal.

9. The flash memory of claim 1, wherein the first memory cell and the second memory cell are NOR cells.

10. The flash memory of claim 1, wherein the flash memory is an embedded flash memory.

11. A margin read test system comprising:
a flash memory including a plurality of memory cells; and
a margin read tester configured to provide the flash memory with a command for performing a margin read test operation to test a read margin of data stored in the plurality of memory cells,
wherein the flash memory includes:
a sense amplifier configured to provide a sensing line with a sensing current for sensing the data stored in the plurality of memory cells; and
a margin read test circuit configured to provide the sensing line with a margin current and to adjust the margin current provided to the sensing line to test the read margin of the data stored in the plurality of memory cells, based on the command.

12. The margin read test system of claim 11, wherein the margin read test circuit includes:
an internal current generator configured to generate an ON margin current or an OFF margin current, based on the command; and
a current buffer configured to receive the ON margin current or the OFF margin current and to adjust the margin current.

13. The margin read test system of claim 12, wherein the internal current generator includes a current option circuit for adjusting the ON margin current.

14. The margin read test system of claim 12, wherein the command comprises a test margin ON signal or a test margin OFF signal, and the current buffer performs an ON margin read test operation or an OFF margin read test operation based on the test margin ON signal or the test margin OFF signal.

15. The margin read test system of claim 14, wherein the current buffer provides the sensing line with the margin current having a positive value based on the test margin ON signal.

16. The margin read test system of claim 14, wherein the current buffer provides the sensing line with the margin current having a negative value based on the test margin OFF signal.

17. The margin read test system of claim 11, wherein the flash memory is an embedded flash memory.

18. A margin read test system comprising:
a flash memory including a plurality of memory cells; and
a margin read tester configured to provide the flash memory with a test command for testing a read margin of data stored in the plurality of memory cells,
wherein the flash memory includes:
a margin read test circuit configured to provide a sensing line with a margin current and to adjust the margin current provided to the sensing line to test the read margin of the data stored in the plurality of memory cells, based on the test command.

19. The margin read test system of claim 18, wherein the margin read test circuit includes:
an internal current generator configured to generate an ON margin current or an OFF margin current, based on the test command; and
a current buffer configured to receive the ON margin current or the OFF margin current and to adjust the margin current.

20. The margin read test system of claim 19, wherein the internal current generator includes a current option circuit for adjusting the ON margin current.

* * * * *